US010569760B2

(12) United States Patent
Meyer et al.

(10) Patent No.: US 10,569,760 B2
(45) Date of Patent: Feb. 25, 2020

(54) SYSTEMS AND METHODS FOR BATTERY CHARGING IN A HYBRID VEHICLE

(71) Applicant: Ford Global Technologies, LLC, Dearborn, MI (US)

(72) Inventors: Jason Meyer, Canton, MI (US); David Farrell, Dearborn, MI (US); Jeffrey Allen Doering, Canton, MI (US); Kevin Ray Ruybal, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 246 days.

(21) Appl. No.: 15/619,130

(22) Filed: Jun. 9, 2017

(65) Prior Publication Data
US 2018/0354492 A1 Dec. 13, 2018

(51) Int. Cl.
*B60W 20/13* (2016.01)
*B60K 6/485* (2007.10)
(Continued)

(52) U.S. Cl.
CPC .............. *B60W 20/13* (2016.01); *B60K 6/48* (2013.01); *B60K 6/485* (2013.01); *B60W 10/06* (2013.01); *B60W 10/08* (2013.01); *B60W 10/26* (2013.01); *B60W 30/14* (2013.01); *B60K 2006/4808* (2013.01); *B60W 2540/10* (2013.01);
(Continued)

(58) Field of Classification Search
CPC ...... B60W 20/13; B60W 10/06; B60W 10/08; B60W 10/26; B60W 30/14; B60W 2540/10; B60W 2540/12; B60W 2710/0666; B60W 2710/244; B60W 2720/10; Y10S 903/93
See application file for complete search history.

(56) References Cited

U.S. PATENT DOCUMENTS 6,845,305 B1   1/2005  Raftari et al.
6,962,551 B1  11/2005  Genise et al.
(Continued)

FOREIGN PATENT DOCUMENTS

DE    10113700 A1    9/2002
DE    10342949 A1    4/2005
WO    2013039726 A1  3/2013

OTHER PUBLICATIONS

Meyer, J. et al., "Methods and System for Operating a Driveline," U.S. Appl. No. 62/469,878, filed Mar. 10, 2017, 68 pages.
(Continued)

*Primary Examiner* — Genna M Mott
(74) *Attorney, Agent, or Firm* — David Kelley; McCoy Russell LLP

(57) ABSTRACT

Methods and systems are provided for rapidly charging a battery in a hybrid vehicle. In one example, a method includes charging a battery at a first rate via an engine transferring torque to a plurality of motor/generators while a vehicle speed is controlled based on a driver demand, and charging the battery at a second rate greater than the first rate via the plurality of motor/generators while the vehicle is autonomously controlled via a cruise control system. In this way, by charging the battery at the second rate while the vehicle speed is being controlled by the cruise control system, drivability issues related to engine torque production and/or motor/generator torque production may be minimized.

20 Claims, 6 Drawing Sheets

(51) Int. Cl.
*B60K 6/48* (2007.10)
*B60W 10/06* (2006.01)
*B60W 10/08* (2006.01)
*B60W 10/26* (2006.01)
*B60W 30/14* (2006.01)

(52) U.S. Cl.
CPC . *B60W 2540/12* (2013.01); *B60W 2710/0666* (2013.01); *B60W 2710/244* (2013.01); *B60W 2720/10* (2013.01); *Y10S 903/93* (2013.01)

(56) References Cited

U.S. PATENT DOCUMENTS

| | | |
|---|---|---|
| 7,268,442 B2 | 9/2007 | Syed et al. |
| 7,703,563 B2 | 4/2010 | Aldrich, III et al. |
| 7,797,096 B2 | 9/2010 | Reynolds et al. |
| 8,376,901 B2 | 2/2013 | Riester et al. |
| 8,924,070 B2 | 12/2014 | Gibson et al. |
| 9,108,638 B2 | 8/2015 | Banker et al. |
| 9,260,107 B2 | 2/2016 | Doering et al. |
| 9,358,974 B2 | 6/2016 | Doering et al. |
| 9,365,121 B2 | 6/2016 | Kim et al. |
| 9,365,211 B2 | 6/2016 | Gibson et al. |
| 9,428,060 B2 | 8/2016 | Lasson et al. |
| 2008/0125265 A1* | 5/2008 | Conlon ................. B60W 10/10 475/5 |
| 2008/0257619 A1* | 10/2008 | Yamazaki ................ B60K 6/44 180/65.265 |
| 2011/0153134 A1 | 6/2011 | Rocq et al. |
| 2012/0022731 A1 | 1/2012 | Kuang et al. |
| 2013/0154576 A1 | 6/2013 | Shin et al. |
| 2014/0074331 A1 | 3/2014 | Shin et al. |
| 2014/0228165 A1 | 8/2014 | Frank et al. |
| 2014/0343775 A1* | 11/2014 | Yamamoto ............. B60K 6/365 701/22 |
| 2015/0114345 A1 | 4/2015 | Lockwood et al. |
| 2015/0274029 A1* | 10/2015 | Tanaka ..................... B60L 7/18 701/22 |
| 2016/0046276 A1 | 2/2016 | Martin et al. |
| 2016/0121742 A1 | 5/2016 | Cho et al. |
| 2017/0072938 A1* | 3/2017 | White ................. B60W 50/082 |

OTHER PUBLICATIONS

Ruybal, K. et al., "System abd Method for Operating a Vehicle Powertrain," U.S. Appl. No. 15/619,136, filed Jun. 9, 2017, 76 pages.

Meyer, J. et al., "Methods and System for Adjusting Engine Torque," U.S. Appl. No. 15/626,750, filed Jun. 19, 2017, 61 pages.

* cited by examiner

SYSTEMS AND METHODS FOR BATTERY CHARGING IN A HYBRID VEHICLE

FIELD

The present description relates generally to methods and systems for controlling a vehicle engine to maximize charging efficiency of an onboard energy storage device in a hybrid electric vehicle.

BACKGROUND/SUMMARY

A hybrid vehicle typically includes a high voltage battery (e.g. a battery which supplies energy or potential energy of about three hundred volts). The high voltage battery is typically used to operate a motor/generator assembly which selectively provides torque to the wheels of the vehicle. Such hybrid vehicles are typically divided into series hybrid electric vehicles (HEVs), parallel HEVs, and series-parallel HEVs. Hybrids that use a series drivetrain may receive mechanical power from the electric motor, which may be run by the high voltage battery, for example. For hybrids with parallel drivetrains, the electric motor and internal combustion engine can provide mechanical power simultaneously. Alternatively, hybrids with series/parallel drivetrains may enable the engine and electric motor to provide power independently or in conjunction with one another.

For hybrid vehicles designed to be performance vehicles, or vehicles designed and built specifically for speed capabilities, maximum performance at a test track or drag strip may dictate the need for rapid charging of the high voltage battery, particularly in a case where fast charging stations are not available. For a performance vehicle with an electric machine positioned in a driveline downstream of a dual clutch transmission (DCT), and with an integrated starter/generator (ISG) positioned upstream of the DCT, the electric machine cannot be used for charging when the vehicle is stationary, and thus only the ISG may be used for charging while the vehicle is stationary. Due to the positioning of the ISG and electric machine in such a vehicle, torque accuracy of the engine, ISG, and electric machine is extremely important during any aggressive charging of the battery.

The inventors herein have recognized these issues, and have developed systems and methods to at least partially address them. In one example, a method is provided, comprising charging a battery in a hybrid vehicle at a first rate via transferring torque from an engine to at least one motor/generator upstream of a transmission coupled to the engine and at least another motor/generator downstream of the transmission while vehicle speed is controlled based on a driver-demand, and charging the battery at a second rate via the upstream and downstream motor/generators while vehicle speed is autonomously controlled. In this way, a battery in a performance vehicle may be aggressively charged without negatively impacting drivability.

As one example of the method, the at least one motor/generator upstream of the transmission and the at least another motor/generator downstream of the transmission further comprises an integrated starter/generator positioned upstream of the transmission, and an electric machine positioned downstream of the transmission. In one example, the speed of the vehicle being controlled autonomously further comprises controlling vehicle speed to a target vehicle speed via a cruise control system. In some examples, the transmission may comprise a dual clutch transmission.

As an example, the method may include mechanically coupling the engine to the transmission while charging the battery at both the first rate and the second rate. Charging the battery at the first rate may further comprise a condition wherein a maximum charging power of the at least one motor/generator positioned upstream of the transmission is not greater than a driver-demanded wheel power by a predetermined threshold. For example, charging the battery at the first rate may include a total charging power of the at least one motor/generator upstream of the transmission and the at least another motor/generator downstream of the transmission to be a function of a predetermined amount of charging torque, or a predetermined percentage of a driver-demanded wheel torque, under conditions where the vehicle speed is controlled based on driver-demand, and where the maximum charging power of the at least one motor positioned upstream of the transmission is not greater than the driver-demanded wheel power by the predetermined threshold. As an example, the predetermined amount of charging torque may be 100 Nm, and the predetermined percentage of the driver-demanded wheel torque may be fifty percent of the driver-demanded wheel torque. Furthermore, the total charging power may equal a product of vehicle speed and the larger of the predetermined amount of charging torque, or the predetermined percentage of the driver-demanded wheel torque.

In yet another example, the method may further comprise mechanically decoupling the engine from the transmission, and charging the battery at a third rate via the at least one motor upstream of the transmission responsive to an indication that the maximum charging power of the at least one motor upstream of the transmission is greater than the driver-demanded wheel power by the predetermined threshold. In such an example, charging the batter at the third rate may comprise charging the battery at the maximum charging power of the at least one motor positioned upstream of the transmission.

In a still further example, charging the battery at the second rate may further comprise commanding each of the at least one motor/generator upstream of the transmission and at least another motor/generator downstream of the transmission to their respective maximum charging power. Furthermore, charging the battery at the second rate may further comprise adjusting engine torque while vehicle speed is autonomously controlled.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
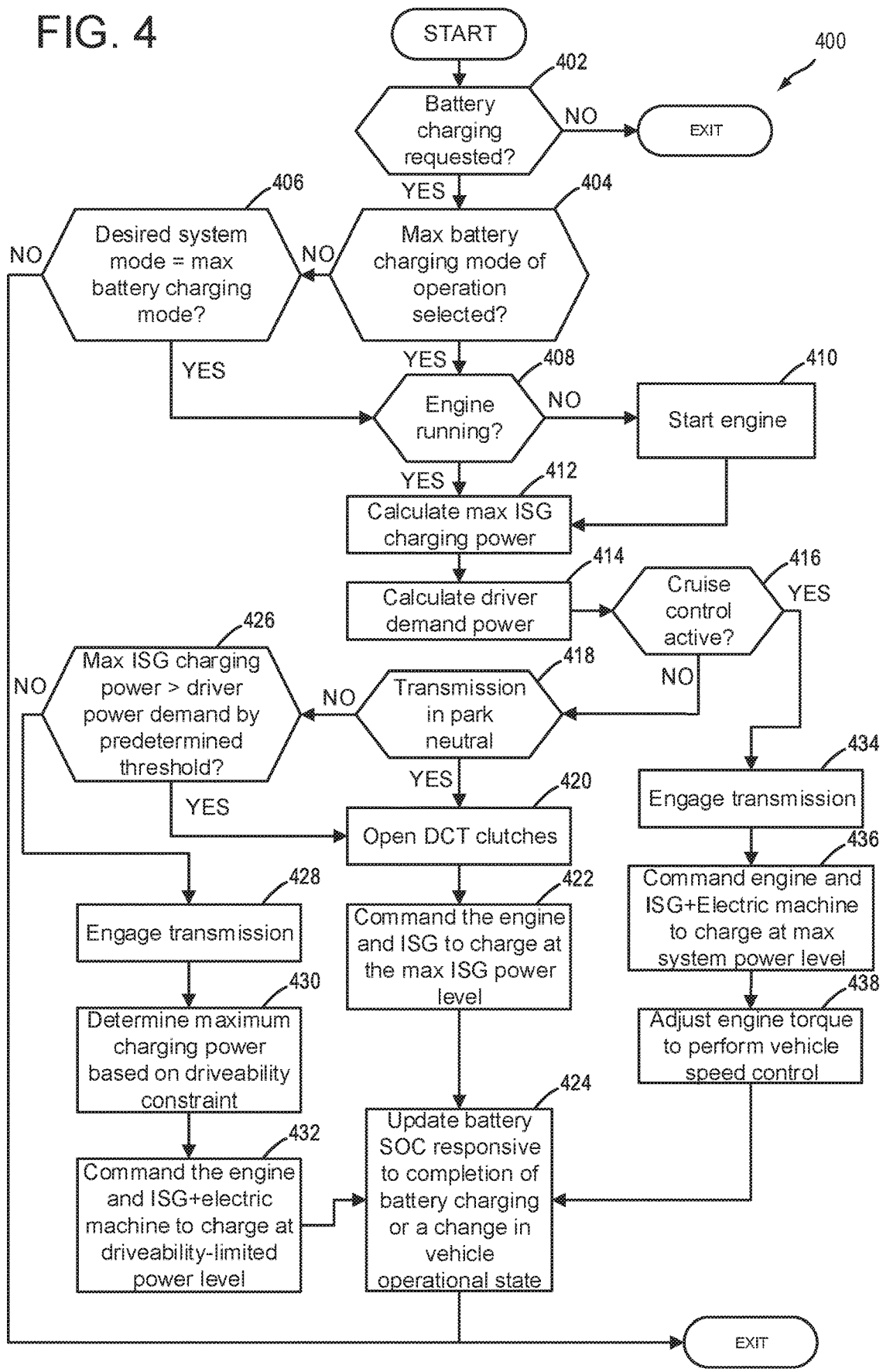
FIG. 4 is a high level example method for charging a high voltage battery in the hybrid vehicle.
Figure 5:
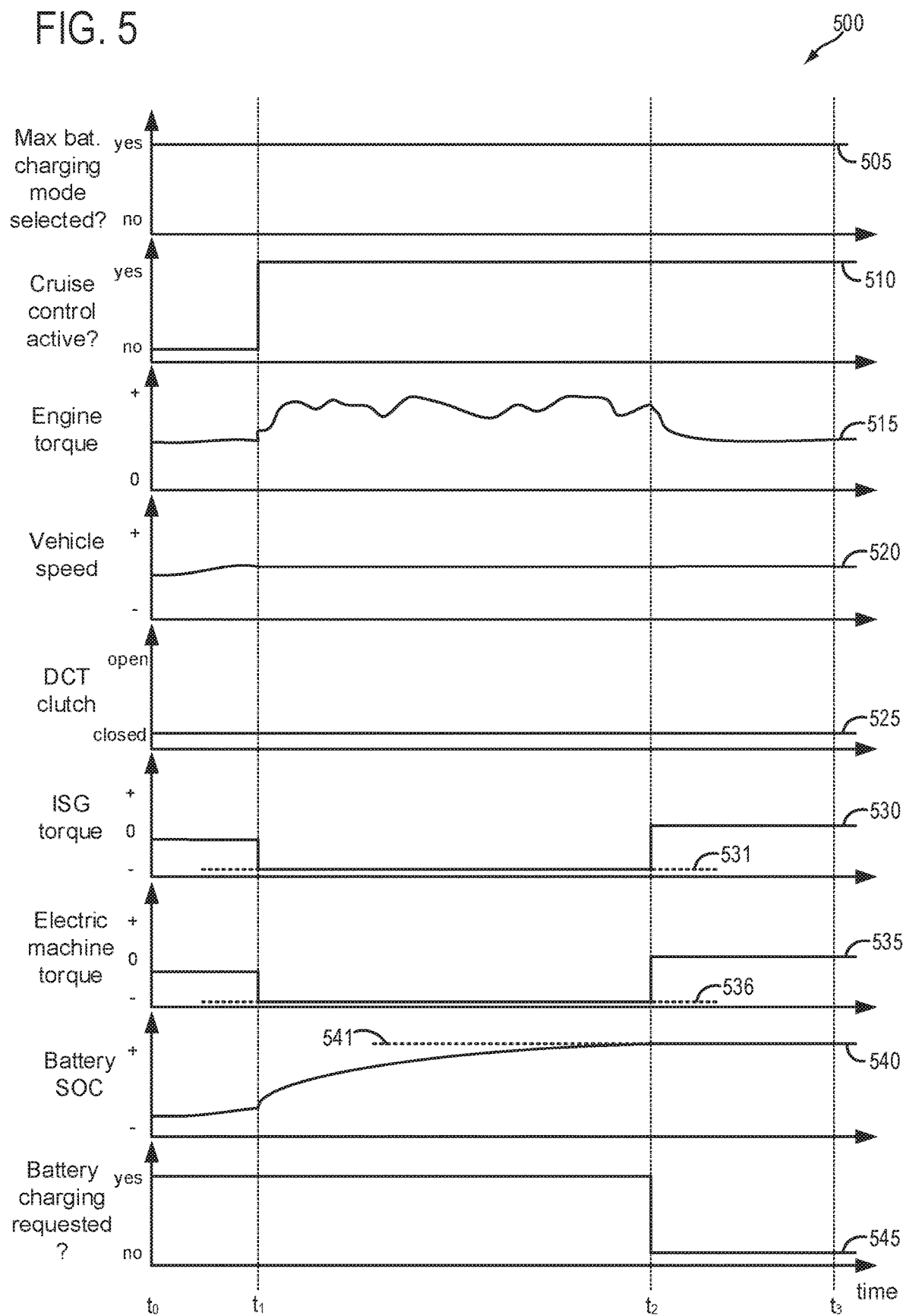
FIG. 5 is an example timeline for charging the high voltage battery, according to the method depicted at FIG. 4.

The following description relates to systems and methods for operating a driveline of a vehicle. FIGS. 1A-3 show an example hybrid vehicle driveling that includes an internal combustion engine, an integrated starter/generator, a dual clutch transmission, and an electric machine. FIG. 4 shows a high level example method for charging a high voltage battery in a hybrid vehicle equipped with an engine, an integrated starter/generator, a transmission, and an electric machine positioned downstream of the transmission. In one example, the transmission comprises a dual clutch transmission. Briefly, the method of FIG. 4 illustrates ways in which charging of the high voltage battery may be differentially accomplished based on vehicle operating conditions, when a vehicle operator has selected a maximum battery charging mode of operation. As an example, when the maximum battery charging mode of operation is selected, the vehicle battery may be charged by both the ISG and the electric machine in a manner in which both the ISG charge torque and the electric machine charge torque are maximized, under conditions where a cruise control system is functioning to autonomously control vehicle speed. By maximizing battery charging while cruise control is active, engine, ISG, and/or electric machine torque delivery errors, which may in some examples contribute to undesired drivability issues, may be avoided or minimized. An example timeline illustrating aggressive charging of the high voltage battery, under different vehicle operating conditions, and according to the method of FIG. 4, is depicted at FIG. 5.

Figure 1A:
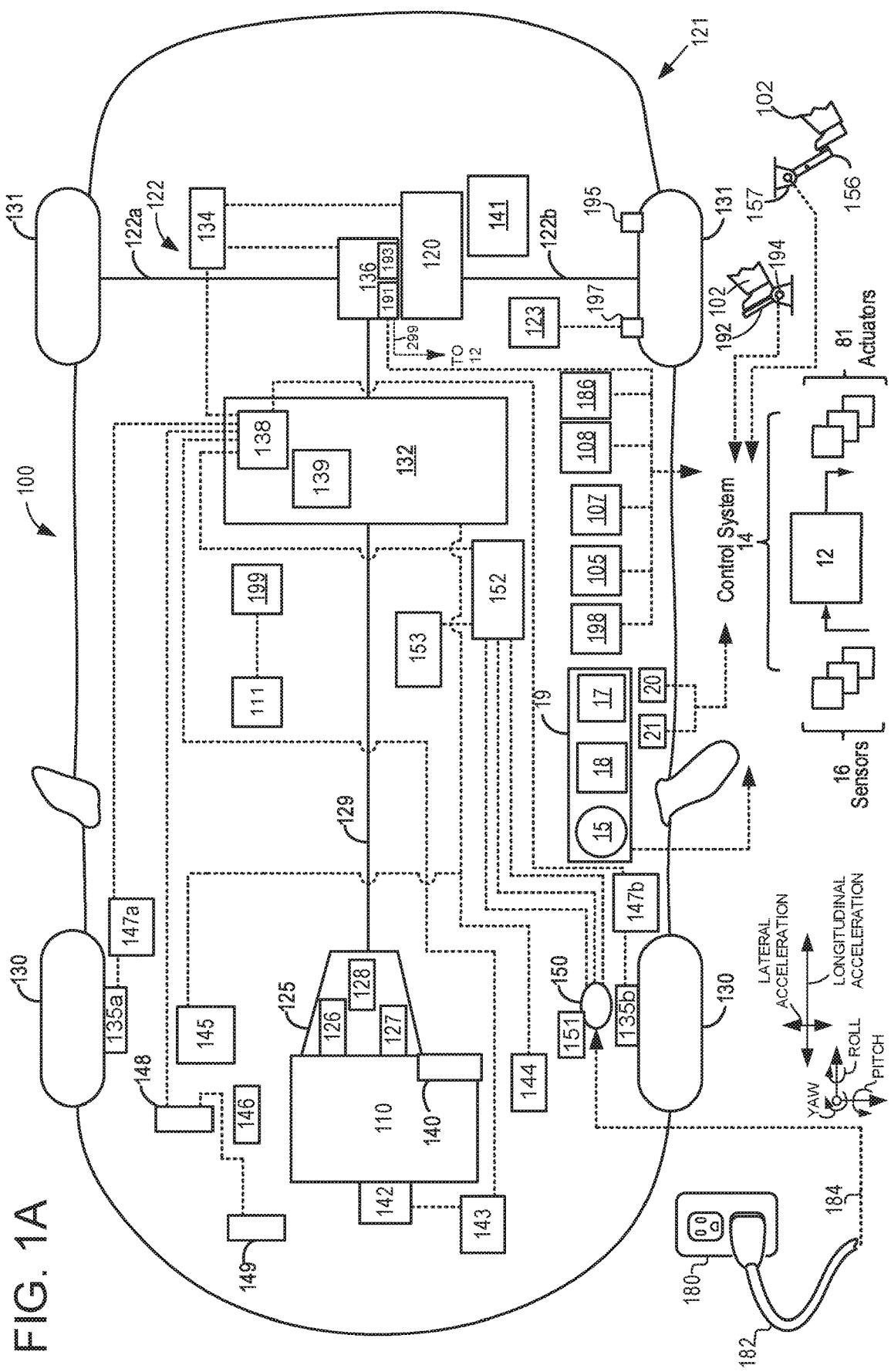
FIG. 1A is a schematic diagram of a hybrid vehicle driveline.

Turning now to the figures, FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122*a*, and second half shaft 122*b*. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122*a* and to axle 122*b*. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122*a* and 122*b* may be equal when electrically controlled differential clutch is open. Torque transfer to axle 122*a* may be different from torque transferred to axle 122*b* when electrically controlled differential clutch 191 is partially closed (e.g., slipping such that speed input to the clutch is different than speed output of the clutch) or closed. Rear drive unit 136 may also include one or more clutches (not shown) to decouple transmission 125 and electric machine 120 from wheels 131. Rear drive unit 136 may be directly coupled to electric machine 120 and axle 122. In some examples, a motor positioned directly downstream of transmission 125 in the direction of positive torque flow from the engine 110 may be substituted for rear drive unit 136.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard electrical energy storage device 132. Furthermore, electric machine 120 may provide a generator function to convert engine output or the vehicle's kinetic energy into electrical energy, where the electrical energy may be stored at electric energy storage device 132 for later use by the electric machine 120 or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135*a* and 135*b* to propel vehicle 121 or to provide regenerative braking via front wheels 130. Third inverter (ISC3) 147*a* may convert alternating current generated by electric machine 135*a* to direct current for storage at the electric energy storage device 132 or provide alternating current to electric machine 135*a* to propel vehicle 121. Likewise, fourth inverter (ISC4) 147*a* may convert alternating current generated by electric machine 135*b* to direct current for storage at the electric energy storage device 132 or provide alternating current to electric machine 135*b* to propel vehicle 121. Electric machines 135*a* and 135*b* may be collectively referred to as front wheel electric machines.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Still further, vehicle propulsion system 100 may also include a cruise control system 186. For example, the cruise control system may comprise a system that autonomously regulates a vehicle speed based on a vehicle operator-defined target speed.

Figure 1B:
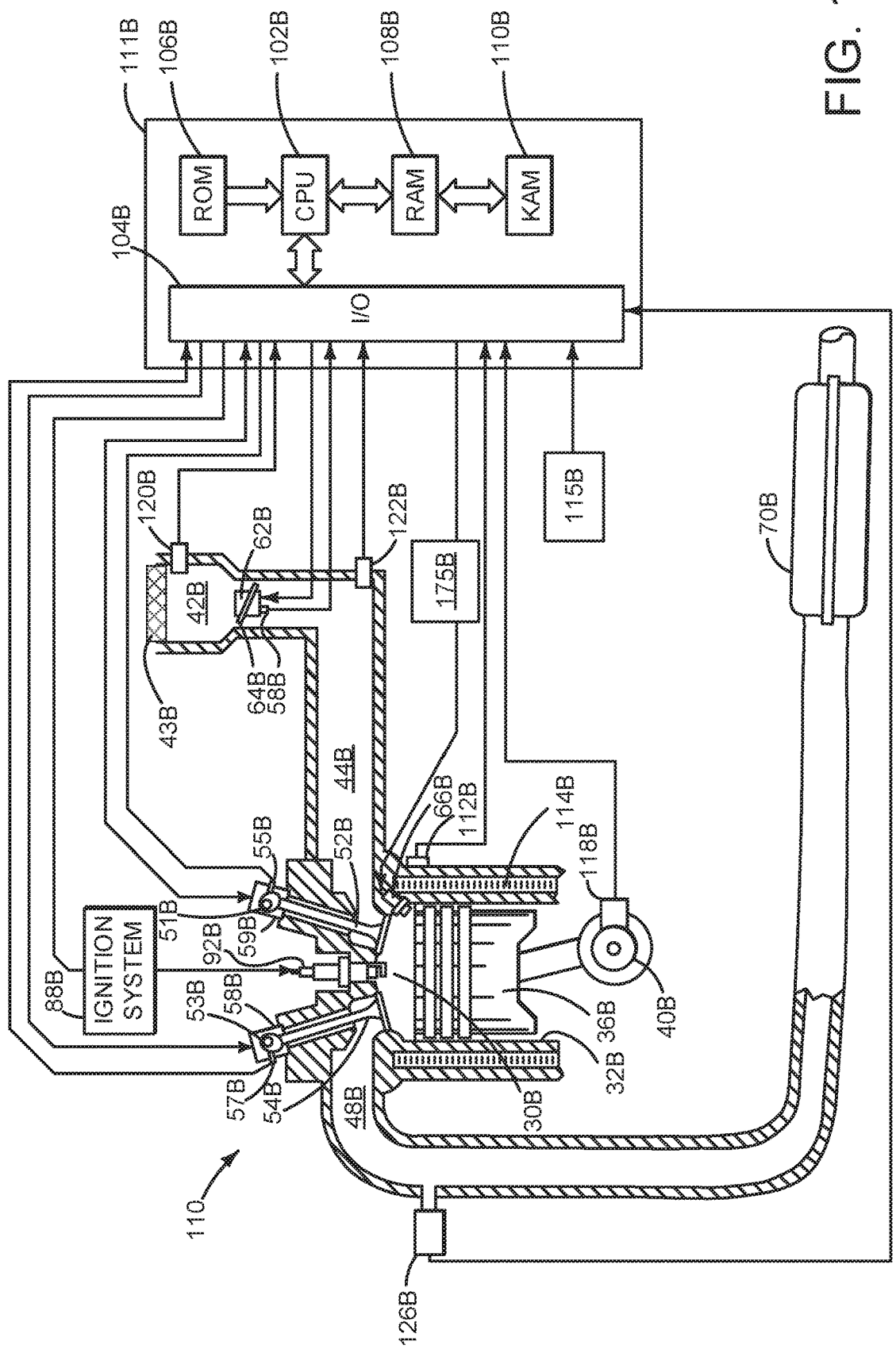
FIG. 1B is a sketch of an engine of the hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
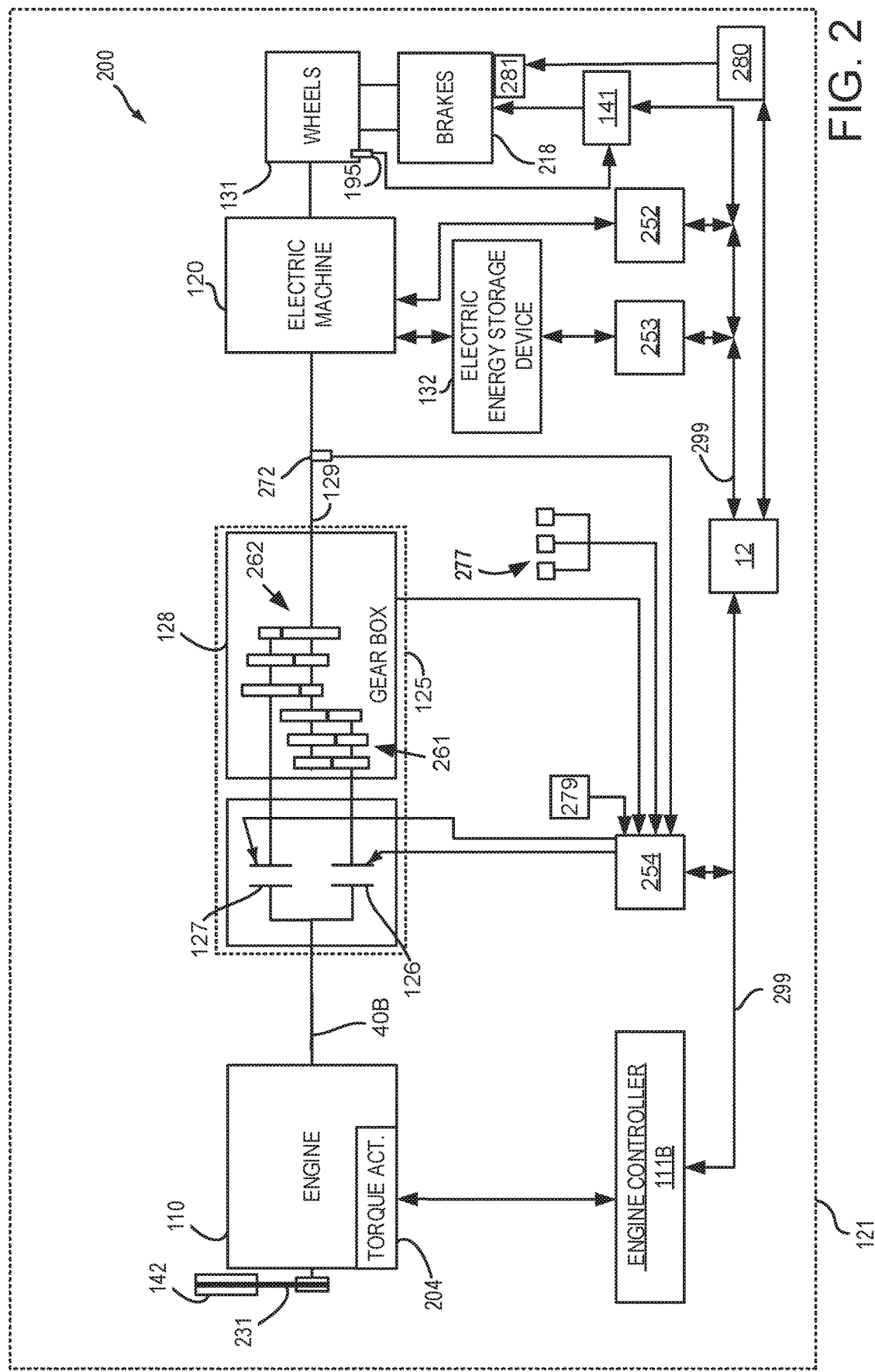
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIGS. 1A-1B. Other components of FIG. 2 that are common with FIGS. 1A and 1B are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Figure 3:
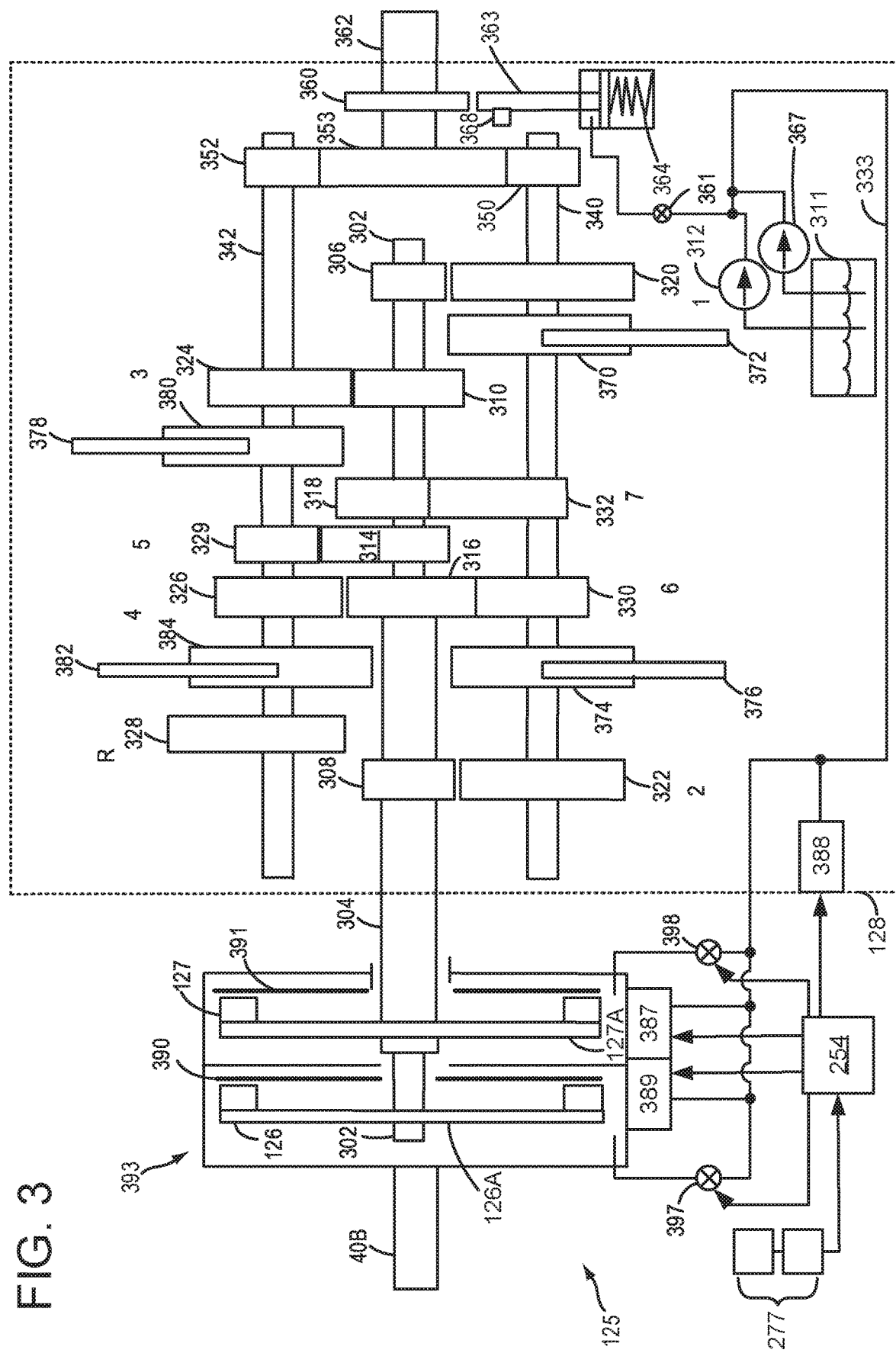
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 329, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 126 and second clutch 127 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 329, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 329, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 329. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

First clutch 126 may be cooled via fluid supplied via pump 312 and/or pump 367. Valve 397 may be opened to cool first clutch 126. First clutch 126 may be cooled at a rate that is significantly greater when first clutch is open and valve 397 is open since flow of fluid to first clutch 126 may be ten times greater than flow of fluid to first clutch 126 when first clutch 126 is closed. In this example, fluid flow to first clutch 126 is via conduit 333, which services valve 398 and other devices. However, in other examples, conduit 333 may be directly coupled to valve 397 to provide more precise fluid flow control. Similarly, second clutch 127 may be cooled via fluid supplied via pump 312 and/or pump 367. Valve 398 may be opened to cool second clutch 127. Second clutch 127 may be cooled at a rate that is significantly greater when second clutch is open and valve 398 is open since flow of fluid to second clutch 127 may be ten times greater than flow of fluid to second clutch 127 when second clutch 127 is closed. In this example, fluid flow to second clutch 127 is via conduit 333, which services valve 398 and other devices. However, in other examples, conduit 333 may be directly coupled to valve 398 to provide more precise fluid flow control.

TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, transmission fork position sensors for detecting positions of selector forks (e.g. 372, 376, 378, 382), and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor.

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 370, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electrically driven transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanically driven pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Thus, discussed herein, a dual clutch transmission (DCT) may comprise a transmission that uses two separate clutches for odd and even gear sets. One clutch (e.g. 126) is utilized to transfer engine torque to one input shaft (e.g. 302), while a separate clutch (e.g. 127) is utilized to transfer engine torque to a separate input shaft (e.g. 304). The dual clutch transmission receives engine torque via an engine crankshaft (e.g. 40B), and outputs torque via an output shaft (e.g. 362).

Thus, the systems described above with regard to FIGS. 1A-3 may comprise an engine, a dual clutch transmission positioned in a driveline of the vehicle downstream of the engine with two clutches configured to transfer engine torque to the dual clutch transmission, and an integrated starter/generator positioned in the driveline upstream of the dual clutch transmission. Such a system may further comprise an electric machine positioned in the driveline downstream of the dual clutch transmission, an onboard energy storage device, a cruise control system, and a selectable maximum battery storage mode of operation. Such a system may further include a controller, storing instructions in non-transitory memory that, when executed, cause the controller to, in response to the maximum battery charging mode being selected, charge the onboard energy storage device via the engine by commanding the integrated starter/generator to a maximum ISG charging power. Such a system may include additional instructions to command the electric machine to a maximum electric machine charging power in response to the vehicle being operated in the maximum battery charging mode of operation, and further responsive to an indication that the cruise control system is actively controlling a vehicle speed to a target vehicle speed.

Such a system may further comprise additional instructions to adjust engine torque to control vehicle speed to the target vehicle speed during charging the onboard energy storage device via the engine by commanding the integrated starter/generator to the maximum ISG charging power, and commanding the electric machine to the maximum electric machine charging power.

Such a system may further comprise additional instructions to charge the onboard energy storage device with the engine via both the integrated starter/generator and the electric machine as a function of driver-demanded wheel power, where a total charging power for the integrated starter/generator and the electric machine is a function of a predetermined charging torque, or a function of a percentage of a driver-demanded wheel torque, under conditions where vehicle speed is not being controlled by the cruise control system, and where a maximum integrated starter/generator power is less than the driver-demanded wheel power by a predetermined threshold; and wherein the total charging power equals a product of vehicle speed and the larger of the predetermined amount of charging torque, or the percentage of driver-demanded wheel torque.

Such a system may still further comprise additional instructions to charge the battery via only the integrated starter/generator responsive to an indication that the maximum charging power of the integrated starter/generator is greater than the driver-demanded wheel power by the predetermined threshold, where charging the battery via only the integrated starter/generator includes fully opening both of the two clutches; and wherein charging the battery via only the integrated starter/generator includes charging the battery at the maximum charging power of the integrated starter/generator.

Turning now to FIG. 4, a high-level example method 400 for charging a high voltage battery in a hybrid electric vehicle, is shown. More specifically, method 400 may include differentially charging the high voltage battery depending on whether the vehicle is stationary (e.g. with the transmission in park or neutral), in operation with the transmission engaged and cruise control inactive (and in some examples with the transmission configured in neutral), or in operation with the transmission engaged and cruise control active. In this way, such a method may minimize the impact of high voltage battery charging on drivability, while maximizing battery charging.

Method 400 will be described with reference to the systems described herein and shown in FIGS. 1A-3, though it should be understood that similar methods may be applied to other systems without departing from the scope of this disclosure. Method 400 may be carried out by a controller, such as controller 12 in FIG. 1A, and may be stored at the controller as executable instructions in non-transitory memory. Instructions for carrying out method 400 and the rest of the methods included herein may be executed by the controller based on instruction stored on a memory of the controller and in conjunction with signals received from sensors of the engine system, such as the sensors described above with reference to FIGS. 1A-3. The controller may employ engine system actuators such as ISG (e.g. 142), electric machine (e.g. 120), first clutch (e.g. 126), second clutch (e.g. 127), etc., according to the method depicted below.

Method 400 begins at 402 and may include indicating whether battery charging is requested via the vehicle controller (e.g. 12). In some examples, battery charging may be indicated to be requested responsive to battery charge being below a threshold charge. In some examples, the threshold charge may vary depending on vehicle operating conditions. However, in other examples, the battery may be charged at any charge state less than a maximal charge level, such that the battery is continually maintained as charged as possible, depending on driver operating conditions.

If, at 402, battery charging is not indicated to be requested, method 400 may exit. Alternatively, if battery charging is indicated to be requested at 402, method 400 may proceed to 404. At 404, method 400 may include indicating whether a maximum battery charging mode of operation is selected. For example, a vehicle operator may select the maximum battery charging mode via a button located on a dashboard (e.g. 19) of the vehicle, which may include a display system (e.g. 18) configured to display such information to the vehicle operator. However, in other examples the option for selecting maximum battery charging mode may not be located on a display screen, but may be located elsewhere in an appropriate location on the vehicle dashboard, or other convenient location in the vehicle. If, at 404, it is indicated that the maximum battery charging mode of operation is not selected, method 400 may proceed to 406. At 406, method 400 may include indicating whether a desired vehicle system mode is the maximum battery charging mode. For example, it may be determined via the vehicle controller based on vehicle operating conditions, that the desired mode for charging may comprise the maximum battery charging mode. In some examples, the vehicle system controller may make such a determination, as discussed above, based on vehicle operating conditions. In one example, such a determination may be made based on a rate at which the battery state of charge (SOC) has become depleted prior to the request for charging. For example, if battery SOC decreases faster than a threshold rate over the course of a predetermined time period prior to the request for battery charging, it may be an indication that the vehicle is being operated in performance mode, or in other words, being used on a test track, drag strip, etc. In other examples, an onboard navigation system (e.g. 17) may be configured to determine a location (e.g. geographical coordinates) of the vehicle, and if the location of the vehicle matches with coordinates of a test track, drag strip, etc., then it may be indicated that the desired system mode includes the maximum battery charging mode. In such an example, coordinates of the test track, drag strip, etc., may be inputted into the onboard navigation system via the vehicle operator, for example. In other examples, the onboard navigation system may cross reference location coordinates to information obtained from the internet, to determine if the vehicle is positioned at a location where maximum battery charging mode is desired.

If, at 406, it is indicated that the desired vehicle system mode is not maximum charging mode, then method 400 may exit. In other words, the vehicle high voltage battery (e.g. 132) may be charged in a way known in the art that does not include maximum battery charging mode. For example, outside of maximum charging mode, a significant portion of battery charging may come from regenerative braking. It may be understood that regenerative braking may comprise an energy recovery mechanism which may slow a vehicle by converting its kinetic energy into a form that can be either used immediately or stored until needed. A much smaller portion of the battery charging outside of maximum charging mode may come from charging via the engine, which may be conducted in two different scenarios. In the first scenario, which may be referred to as opportunistic charging, engine charging may be used to increase the load on the engine and allow the engine to operate at a more efficient operating condition. In the second scenario, engine charging may be performed when the battery state of charge is sufficiently low (e.g. near its minimum operating limit). These two scenarios may be conducted sporadically as requested. For example, the system may not perform battery charging via the engine during a charge depleting operation (however charging via regenerative braking may still be conducted). Alternatively, in maximum battery charging mode, the battery may be actively and continuously charged until the battery is fully charged.

Alternatively, if it is indicated that maximum battery charging mode has been selected, for example, via the vehicle operator, or if it is indicated that the vehicle operator has not selected the maximum battery charging mode, but where it is indicated that the desired system mode is the maximum battery charging mode, method 400 may proceed to 408. At 408, method 400 may include indicating whether the engine is running. For example, a running engine may be understood to be an engine that is combusting air and fuel. If, at 408, it is indicated that the engine is not running, method 400 may proceed to 410. At 410, method 400 may include starting the engine. For example, the vehicle controller may initiate the providing of fuel via one or more fuel injectors (e.g. 66B), and providing spark via one or more spark plugs (e.g. 92B) to one or more engine cylinders (e.g. 30B).

Responsive to an indication that the engine is running, method 400 may proceed to 412. At 412, method 400 may include indicating a maximum ISG (e.g. 142) charging power. In one example, the value of maximum ISG charging power may be stored in a memory of the controller, and which may be retrieved by method 400. In some examples, the value of maximum ISG charging power may vary as a function of operational conditions, such as temperature, for example. It may be understood that, at 412, indicating a maximum ISG charging power may comprise indicating a maximum allowable charging power, in the absence of other external constraints.

Continuing to 414, method 400 may include calculating driver demand power. Driver demand power may be a indicated based on a driver-demanded wheel torque or a torque at another location along the driveline, such as at a transmission output shaft. In one example, the driver demand power is a function of accelerator pedal position and vehicle speed. The accelerator position and vehicle speed may be used to index or reference a table in memory that holds empirically determined values of wheel torque or other torques. The table may output the driver demanded torque, driver demanded power, etc.

Proceeding to 416, method 400 may include indicating whether a cruise control system (e.g. 186) is active, or not. If the cruise control system is active, it may be understood that the cruise control system may be autonomously controlling a speed of the vehicle. It may be further understood that operating the vehicle via cruise control may be initiated via the vehicle operator, for example. If, at 416, it is indicated that the cruise control system is not in operation, method 400 may proceed to 418.

At 418, method 400 may include indicating whether a transmission (e.g. 125) is configured in a park mode of operation, or a neutral mode of operation. If, at 418, it is indicated that the transmission is in either park or neutral, method 400 may proceed to 420. At 420, method 400 may include commanding open, or maintaining open, both clutches (e.g. 126, 127) of the dual clutch transmission (e.g. 125). It may be understood at 420 that commanding open both clutches may include fully opening the transmission clutches such that the engine (e.g. 110) is mechanically decoupled from the transmission and vehicle wheels. Responsive to an indication that the clutches are both fully open, method 400 may proceed to 422.

At 422, method 400 may include commanding the engine and ISG to charge at the maximum ISG power level, the maximum ISG power level indicated at step 412 of method 400. It may be understood that, with the DCT clutches fully open, the battery may be charged in a series mode of operation at 422. Because only the ISG is being utilized as a generator to charge the battery, it may be understood that charging via only the ISG where the ISG is commanded to charge at the maximum ISG charging power level, battery charging may proceed at a defined rate. More specifically, the defined rate may be a function of the maximum ISG charging power level as indicated at step 412. As an example, the engine may be placed in a speed control of operation, where engine torque is varied to control engine speed to a target engine speed, while the ISG is commanded to its maximum charging torque (corresponding to its maximum charging power). Because the DCT clutches are fully opened, any engine and/or ISG torque estimation errors may not result in drivability issues.

Proceeding to 424, method 400 may include updating a SOC of the battery responsive to completion of battery charging, or responsive to a change in vehicle operational state that dictates ceasing charging of the battery. For example, charging may be complete in some examples responsive to battery SOC reaching a level greater than a predetermined SOC threshold. In such an example, the vehicle controller may update the battery SOC to indicate the battery is fully charged. In other examples, where vehicle operating conditions may have changed such that charging the battery is no longer desirable, the vehicle controller may update a battery SOC based on how much the battery was charged prior to ceasing charging the battery. With the battery SOC updated, method 400 may exit.

Returning to 418, if it is indicated that the cruise control system is not active, and further responsive to an indication that the transmission is in a configuration other than park or neutral, method 400 may proceed to 426. At 426, method 400 includes indicating whether maximum ISG charging power, as indicated at step 412 of method 400, is greater than driver demand power, as indicated at step 414 of method 400, by a predetermined threshold. If, at 426, maximum ISG charging power is indicated to be greater than driver demand power by the predetermined threshold, then method 400 may proceed to step 420, where the DCT clutches may be fully opened, as discussed above, and where the battery may be charged via series operation, as discussed. In other words, although the transmission is not indicated to be in park or neutral, because the maximum ISG charging power is greater than driver demand power by the predetermined threshold, wheel torque demand may be met via the electric machine (e.g. 120), such that the battery may be charged in a series mode of operation with both DCT clutches fully opened.

Alternatively, at 426, if it is indicated that the maximum ISG charging power is not greater than driver demand power by the predetermined threshold, method 400 may proceed to 428. At 428, method 400 may include engaging the transmission. At 428, it may be understood that engaging the transmission may comprise closing, or partially closing one of the DCT clutches, to at least partially mechanically couple the engine to the wheels, via the transmission. In other words, when it is indicated that charging of the battery via the ISG alone in a series mode of operation would not be efficient due to the amount of battery power being utilized to meet driver demand via the electric machine (e.g. 120), then the vehicle controller may at least partially mechanically couple the engine to the transmission at step 428.

Proceeding to 430, method 400 may include determining a total maximum charging power (e.g. total charging power) as a function of drivability constraints. For example, drivability constraints may comprise a threshold charging torque, where the threshold charging torque may be a function of driver demanded wheel power. By determining a maximum charging power as a function of a drivability constraint, where the drivability constraint is a function of driver demanded wheel power, an impact of torque delivery error(s) from one or more of the engine, ISG, electric machine, etc., may be minimized such that drivability may be minimally impacted. As an example, total maximum charging power may be controlled as a function of a percentage (e.g. 50%) of driver demanded wheel torque, or may be controlled as a function of a fixed charging torque (e.g. 100 Nm). In some examples, total charging power may be a function of the larger of the percentage of driver demand power and the fixed charging torque. In such examples, total charging power may be a product of engine speed, and the larger of the fixed charging torque (e.g. 100 Nm) and percentage (e.g. 50%) of driver demanded wheel torque. Such values are meant to be illustrative, and total charging power may be a function of fixed charging torque either larger or smaller than either 100 Nm, or larger or smaller than 50% of driver demanded wheel torque.

Proceeding to 432, method 400 may include charging the battery in a parallel mode of hybrid operation. Charging the battery in the parallel mode of hybrid operation may include operating both the ISG (e.g. 142) and the electric machine (e.g. 120) as generators, with the engine providing power to charge the battery via both the ISG and electric machine. It may be understood that, due to the total maximum charging power being a function of the drivability constraints, neither the ISG nor the electric machine may be operating at their respective maximum allowable charging power, but rather, both the ISG and the electric machine are controlled such that the total maximum charging power (as split between the ISG and electric machine) comprises the charging power that is a function of the drivability constraints (as determined at step 430). Furthermore, it may be understood that a rate at which the battery is charged at step 432 may be different than the rate at which the battery is charged at step 422 of method 400.

Continuing to 424, method 400 may include updating the battery SOC responsive to completion of battery charging or responsive to a change in vehicle operating state that dictates stopping charging of the battery. As discussed above, charging may be indicated to be complete in some examples responsive to battery SOC reaching a level greater than a predetermined SOC threshold. In other examples, charging may be completed responsive to a change in vehicle operating conditions that dictate stoppage of battery charging. In either case, the vehicle controller may update a battery SOC based on a level of charge the battery reached during charging prior to ceasing charging the battery. With the battery SOC updated, method 400 may exit.

Returning now to step 416, if it is indicated that the cruise control system is actively regulating vehicle speed autonomously, then method 400 may proceed to 434. At 434, method 400 may include at least partially mechanically coupling the engine to the transmission and to the vehicle wheels by at least partially closing one of the DCT clutches (e.g. 126, 127). Proceeding to 436, method 400 may include charging the battery in a parallel mode of hybrid operation, by commanding the engine to charge the battery via both the ISG and the electric machine at a maximum system capability. For example, the ISG may be commanded to its maximum charging torque (corresponding to its maximum charging power), while the electric machine may be commanded to its maximum charging torque value (corresponding to its maximum charging power), subject to battery charging power limits. It may be understood that the rate at which the battery is charged at step 436 may be different than the rate at which the battery is charged at step 432 of method 400, or step 422 of method 400. For example, the rate at which the battery is charged at step 436 may be greater than the rate at which the battery is charged at either step 432, or step 422, of method 400.

Proceeding to 438, method 400 may include adjusting engine torque to achieve a desired vehicle speed, where the desired vehicle speed may be a value commanded via the active cruise control system. In an example where cruise control were not active, there may be torque estimation errors contributed by one or more of the engine (e.g. 110), ISG (e.g. 142), and/or electric machine (e.g. 120) which may in some examples result in drivability issues. However, because the cruise control system is active, a desired or target vehicle speed is known, and thus engine torque may be dynamically adjusted. For example, cruise control systems typically adjust vehicle system torque demand to correct for torque delivery errors, road load estimation errors, vehicle mass estimation errors, and road grade. It may be understood that cruise control in maximum battery charging mode will correct for the same errors, however it may be expected that a range of torque delivery errors (contributed via the engine, ISG, and/or electric machine)

may be greater when operating in the maximum battery charging mode. By combining the maximum charging mode with cruise control, the vehicle system may charge the battery as fast as possible without negatively impacting drivability.

Proceeding to 424, method 400 may include updating battery SOC responsive to completion of battery charging or responsive to a change in vehicle operating state that dictates stopping charging of the battery. As discussed, charging may be indicated to be complete in some examples responsive to battery SOC reaching a level greater than a predetermined SOC threshold. In other examples, charging may be completed responsive to a change in vehicle operating conditions that dictate stoppage of battery charging. In either case, the vehicle controller may update a battery SOC based on a level of charge the battery reached during charging prior to ceasing charging the battery. With the battery SOC updated, method 400 may exit.

Turning to FIG. 5, an example timeline 500 is shown, for charging a high voltage battery in a hybrid electric vehicle according to method 400 depicted herein, and as applied to the systems described herein and with reference to FIGS. 1A-3. Timeline 500 includes plot 505, indicating whether a maximum battery charging mode has been selected (yes), or not (no) by a vehicle operator, over time. Timeline 500 further includes plot 510, indicating whether a cruise control system (e.g. 186) is active (yes) or not (no), over time. Timeline 500 further includes plot 515, indicating an amount of engine torque, over time. It may be understood that in example timeline 500, the engine is either not producing torque (0), or is transferring positive torque (+) to one or more of the ISG (e.g. 142), electric machine (e.g. 120), wheels (e.g. 130, 131), transmission (e.g. 125). Timeline 500 further includes plot 520, indicating a speed of the vehicle, over time. Vehicle speed may either be increasing (+), or decreasing (−), over time. Timeline 500 further includes plot 525, indicating whether a clutch of the dual clutch transmission (e.g. 125), is open, or closed, over time. It may be further understood that in example timeline 500, "open" refers to "fully open", and "closed" refers to "fully closed". Furthermore, although it may be understood that the dual clutch transmission may include two clutches, only one clutch is shown for simplicity, which will be designated first clutch (e.g. 126). It may be further understood that, over the timeline of FIG. 5, the clutch that is not illustrated (e.g. 127) is fully open.

Timeline 500 further includes plot 530, indicating ISG (e.g. 142) torque, over time. It may be understood that the ISG may be acting as a motor, producing positive (+) torque to drive the vehicle wheels or to turn the engine, or may act as a generator, producing negative (−) torque to charge the battery (e.g. 132). Line 531 represents a maximum ISG charging torque (corresponding to a maximum ISG charging power). Timeline 500 further includes plot 535, indicating an electric machine (e.g. 120) torque, over time. It may be understood that the electric machine may be acting as a motor, producing positive (+) torque to drive the vehicle wheels or to turn the engine, or may act as a generator, producing negative (−) torque to charge the battery (e.g. 132). Line 536 represents a maximum electric machine charging torque (corresponding to a maximum electric machine charging power). Timeline 500 further includes plot 540, indicating a battery (e.g. 132) state of charge (SOC), over time. Line 541 represents a maximum SOC that the battery is capable of accepting. Timeline 500 further includes plot 545, indicating whether battery charging is requested, for example, via the vehicle controller (e.g. 12), over time.

At time t0, the vehicle is in operation, with the engine producing positive torque to drive the vehicle, indicated by plot 515. First clutch, indicated by plot 525, is closed, thus enabling engine torque to be transferred through the transmission (e.g. 125) to drive the vehicle. Furthermore, battery charging is indicated to be requested by the vehicle controller, indicated by plot 545. As the vehicle operator has selected the maximum battery charging mode, indicated by plot 505, a portion of engine torque, illustrated by plot 515, is being utilized to charge the battery via both the ISG, indicated by plot 530, and the electric machine, indicated by plot 535, acting as generators. More specifically, it may be understood that at time t0 the maximum ISG charging power is not greater than driver demanded wheel power by the predetermined threshold (refer to step 426 of method 400). Thus, series charging of the battery may not be conducted by mechanically decoupling (e.g. fully opening both DCT clutches) the engine from the transmission and charging only via the ISG. Instead, because vehicle speed is not being controlled autonomously via the cruise control system, indicated by plot 510, maximum battery charging is limited based on a drivability constraint, as discussed above. Briefly, the drivability constraint may comprise a threshold charging power. The threshold charging power may be controlled to be based on of a percentage (e.g. 50%) of driver demanded wheel torque, or a fixed charging torque (e.g. 100 Nm). For example, maximum charging power may equal the product of engine speed and the larger of the fixed charging torque, or percentage of driver demand.

Accordingly, at time t0, both the ISG and the electric machine are functioning as generators, but neither the ISG nor the electric machine are producing a maximum charging torque (corresponding to a maximum charging power), respectively. Rather, the ISG is absorbing a defined fraction of engine torque, while the electric machine is absorbing another defined fraction of engine torque, to charge the battery according to the drivability constraint. Allocation of how much each of the ISG and the electric machine contribute to the charging of the battery may be determined by the vehicle controller, for example. Such a determination may be based at least in part by temperature of each of the ISG and the electric machine. For example, allocation of an amount of charging torque commanded by the ISG and the electric machine may be determined by the vehicle controller such that charging of the battery is as efficient as possible given the drivability constraint.

Thus, between time t0 and t1, battery SOC increases, the result of the engine providing torque to both the ISG and electric machine, each acting as generators, to charge the battery.

At time t1, the vehicle operator selects the cruise control mode of vehicle operation. With the vehicle speed being controlled autonomously, and because the maximum battery charging mode is selected, engine torque may be utilized to charge the battery by operating both the ISG and electric machine at their respective maximum charging torques (corresponding to their respective maximum charging powers, respectively). Thus, at time t1, ISG torque is commanded to its maximum charging torque, represented by line 531, and electric machine torque is commanded to its maximum charging torque, represented by line 536. Between time t1 and t2, engine torque is controlled to maintain vehicle speed at the target vehicle speed, the target vehicle speed commanded or set via the cruise control system. Engine torque may be varied by any means known in the art, for example by varying an opening of an air intake throttle (e.g. 62B), by increasing or decreasing fuel injection to one or more engine cylinders, by controlling spark to the one or more engine cylinders, etc. Engine torque may be varied, for example, to correct for any engine, ISG, or electric machine torque delivery errors that may occur while aggressively charging the battery between time t1 and t2.

Between time t1 and t2, battery SOC increases. It may be appreciated that the rate at which the battery is charged between time t0 and t1 is less than the rate at which the battery is charged between time t1 and t2. At time t2, the battery SOC reaches a maximum amount of charge that the battery is capable of accepting, represented by line 541. With the battery SOC having reached the maximum amount of charge that the battery is capable of accepting, battery charging is no longer indicated to be requested at time t2, illustrated by plot 545. Accordingly, the vehicle controller commands both the ISG and the electric machine to stop producing a charging torque (corresponding to a charging power) to supply charge to the battery. With the ISG and electric machine not being utilized to charge the battery, engine torque is controlled to a level based on driver demand, without any excess engine torque being utilized for energy production. Accordingly, between time t2 and t3, vehicle speed is regulated by controlling engine torque, as the vehicle speed is still being dictated by the cruise control system, illustrated by plot 510.

In this way, a battery in a hybrid vehicle equipped with an engine, and ISG, and an electric machine positioned downstream of a dual clutch transmission, may be rapidly charged without negatively impacting drivability. Such action may be beneficial for a performance vehicle for which having the battery maximally charged may be important for performance on a test track or drag strip, for example, particularly in cases where fast charging stations are not available.

The technical effect is to recognize that aggressive charging of a high voltage battery in a vehicle as described above with reference to FIGS. 1A-3, may result in torque accuracy issues that may in some examples impact drivability of the vehicle. By providing a selectable maximum battery charging mode, charging may be conducted in as aggressive a fashion as possible without impacting drivability. For example, a technical effect is to recognize that when a vehicle speed is being controlled in an autonomous fashion via a cruise control system of the vehicle being active, engine torque may be adjusted to achieve the desired vehicle speed, and further adjusted to correct for torque estimation/delivery errors. Furthermore, by providing three distinct methods of charging the high voltage battery when the maximum battery charging mode is selected, charging of the battery may be achieved in as aggressive a fashion as possible without affecting drivability.

The systems described herein, and with reference to FIGS. 1A-3, along with the methods described herein, and with reference to FIG. 4, may enable one or more systems and one or more methods. In one example, a method comprises charging a battery in a hybrid vehicle at a first rate via transferring torque from an engine to at least one motor/generator upstream of a transmission coupled to the engine and at least another motor/generator downstream of the transmission while vehicle speed is controlled based on a driver-demand; and charging the battery at a second rate via the upstream and downstream motor/generators while vehicle speed is autonomously controlled. In a first example of the method, the method further includes wherein the at least one motor/generator upstream of the transmission and the at least another motor/generator downstream of the transmission further comprises: an integrated starter/generator positioned upstream of the transmission, and an electric machine positioned downstream of the transmission. A second example of the method optionally includes the first example, and further includes wherein the speed of the vehicle being controlled autonomously further comprises controlling vehicle speed to a target vehicle speed via a cruise control system. A third example of the method optionally includes any one or more or each of the first and second examples, and further includes wherein the transmission further comprises a dual clutch transmission. A fourth example of the method optionally includes any one or more or each of the first through third examples, and further comprises mechanically coupling the engine to the transmission while charging the battery at both the first rate and at the second rate. A fifth example of the method optionally includes any one or more or each of the first through fourth examples, and further includes wherein charging the battery at the first rate further comprises a condition wherein a maximum charging power of the at least one motor/generator positioned upstream of the transmission is not greater than a driver-demanded wheel power by a predetermined threshold. A sixth example of the method optionally includes any one or more or each of the first through fifth examples, and further includes wherein charging the battery at the first rate includes commanding a total charging power of the at least one motor/generator upstream of the transmission and the at least another motor/generator downstream of the transmission to be a function of a predetermined amount of charging torque, or a predetermined percentage of a driver-demanded wheel torque, under conditions where the vehicle speed controlled based on driver-demand, and where the maximum charging power of the at least one motor positioned upstream of the transmission is not greater than the driver-demanded wheel power by the predetermined threshold. A seventh example of the method optionally includes any one or more or each of the first through sixth examples, and further includes wherein the predetermined amount of charging torque is 100 Nm, and wherein the predetermined percentage of the driver-demanded wheel torque is fifty percent of the driver-demanded wheel torque. An eighth example of the method optionally includes any one or more or each of the first through seventh examples, and further includes wherein the total charging power equals a product of vehicle speed and the larger of the predetermined amount of charging torque, or the predetermined percentage of the driver-demanded wheel torque. A ninth example of the method optionally includes any one or more or each of the first through eighth examples, and further includes wherein the total charging power equals a product of vehicle speed and the larger of the predetermined amount of charging torque, or the predetermined percentage of the driver-demanded wheel torque. A tenth example of the method optionally includes any one or more or each of the first through ninth examples, and further includes wherein charging the battery at the second rate further comprises commanding each of the at least one motor/generator upstream of the transmission and at least another motor/generator downstream of the transmission to their respective maximum charging power. An eleventh example of the method optionally includes any one or more or each of the first through tenth examples, and further includes wherein charging the battery at the second rate further comprises adjusting engine torque while vehicle speed is autonomously controlled. A twelfth example of the method optionally includes any one or more or each of the first through eleventh examples, and further includes wherein charging the battery in the hybrid vehicle further comprises a vehicle operator-selected maximum battery charging mode of operation.

An example of a system for a vehicle comprises an engine; a dual clutch transmission positioned in a driveline of the vehicle downstream of the engine with two clutches configured to transfer engine torque to the dual clutch transmission; an integrated starter/generator positioned in the driveline upstream of the dual clutch transmission; an electric machine positioned in the driveline downstream of the dual clutch transmission; an onboard energy storage device; a cruise control system; a selectable maximum battery charging mode of operation; and a controller, storing instructions in non-transitory memory that, when executed, cause the controller to: responsive to the maximum battery charging mode being selected, charge the onboard energy storage device via the engine by commanding the integrated starter/generator to a maximum ISG charging power, and command the electric machine to a maximum electric machine charging power in response to the vehicle being operated in a maximum battery charging mode of operation, and further responsive to an indication that the cruise control system is actively controlling a vehicle speed to a target vehicle speed. A first example of the system further comprises additional instructions to adjust engine torque to control vehicle speed to the target vehicle speed during charging the onboard energy storage device via the engine by commanding the integrated starter/generator to the maximum ISG charging power, and commanding the electric machine to the maximum electric machine charging power. In a second example of the system, the system optionally includes the first example and further comprises additional instructions to charge the onboard energy storage device with the engine via both the integrated starter/generator and the electric machine as a function of driver-demanded wheel power, where a total charging power for the integrated starter/generator and the electric machine is a function of a predetermined charging torque, or a function of a percentage of a driver-demanded wheel torque, under conditions where vehicle speed is not being controlled by the cruise control system, and where a maximum integrated starter/generator power is less than the driver-demanded wheel power by a predetermined threshold; and wherein the total charging power equals a product of vehicle speed and the larger of the predetermined amount of charging torque, or the percentage of driver-demanded wheel torque. In a third example of the system, the system optionally includes any one or more or each of the first through second examples, and further comprises additional instructions to charge the battery via only the integrated starter/generator responsive to an indication that the maximum charging power of the integrated starter/generator is greater than the driver-demanded wheel power by the predetermined threshold, where charging the battery via only the integrated starter/generator includes fully opening both of the two clutches; and wherein charging the battery via only the integrated starter/generator includes charging the battery at the maximum charging power of the integrated starter/generator.

A driveline operating method comprises in response to a maximum battery charging mode in a hybrid vehicle being selected by a vehicle operator, charging the battery at a first rate via only a first motor/generator positioned upstream of a dual clutch transmission under conditions where a maximum charging power of the first motor/generator is greater than a driver demanded wheel power by a predetermined threshold; charging the battery at a second rate via both the first motor/generator and a second motor/generator positioned downstream of the dual clutch transmission under conditions where the maximum charging power of the first motor/generator is not greater than the driver demanded wheel power by the predetermined threshold, and where charging the battery at the second rate further comprises a total charging power of the first motor/generator and the second motor/generator that equals a product of a vehicle speed and the larger of a predetermined charging torque or a predetermined percentage of a driver-demanded wheel torque; and charging the battery at a third rate via both the first motor/generator and the second motor/generator under conditions where the vehicle speed is being controlled autonomously to a target vehicle speed via a cruise control system, where charging the battery at the third rate includes controlling the first motor/generator to a first motor/generator maximum charging power, and controlling the second motor/generator to a second motor/generator maximum charging power. In a first example of the method, the method further comprises adjusting engine torque while charging the battery at the third rate to control the vehicle speed to the target vehicle speed. In a second example of the method, the method further comprises mechanically decoupling the engine from the transmission to charge the battery at the first rate; and mechanically coupling the engine to the transmission to charge the battery at both the second rate and the third rate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
charging a battery in a hybrid vehicle at a first rate via transferring torque from an engine to at least one motor/generator upstream of a transmission coupled to the engine and at least another motor/generator downstream of the transmission while vehicle speed is controlled based on a driver-demand;
charging the battery at a second rate, different from the first rate, via the upstream and downstream motor/generators while vehicle speed is autonomously controlled; and
charging the battery at a third rate, different from the first rate and the second rate, via the at least one motor/generator upstream of the transmission while the engine is mechanically decoupled from the transmission and in response to a maximum battery charging mode in the hybrid vehicle being selected.

2. The method of claim 1, wherein the at least one motor/generator upstream of the transmission and the at least another motor/generator downstream of the transmission further comprises:
an integrated starter/generator positioned upstream of the transmission, and an electric machine positioned downstream of the transmission.

3. The method of claim 1, wherein the speed of the vehicle being controlled autonomously further comprises controlling vehicle speed to a target vehicle speed via a cruise control system.

4. The method of claim 1, wherein the transmission further comprises a dual clutch transmission.

5. The method of claim 1, further comprising mechanically coupling the engine to the transmission while charging the battery at both the first rate and at the second rate.

6. The method of claim 1, wherein charging the battery at the first rate includes charging when a maximum charging power of the at least one motor/generator positioned upstream of the transmission is within a predetermined threshold of driver-demanded wheel power.

7. The method of claim 6, wherein charging the battery at the first rate includes commanding a total charging power of the at least one motor/generator upstream of the transmission and the at least another motor/generator downstream of the transmission to be a function of a predetermined amount of charging torque, or a predetermined percentage of a driver-demanded wheel torque, under conditions where the vehicle speed is controlled based on driver-demand, and where the maximum charging power of the at least one motor/generator positioned upstream of the transmission is less than the predetermined threshold of driver-demanded wheel power.

8. The method of claim 7, wherein the predetermined amount of charging torque is 100 Nm, and wherein the predetermined percentage of the driver-demanded wheel torque is fifty percent of the driver-demanded wheel torque.

9. The method of claim 7, wherein the total charging power equals a product of vehicle speed and the larger of the predetermined amount of charging torque, or the predetermined percentage of the driver-demanded wheel torque.

10. The method of claim 7, further comprising mechanically decoupling the engine from the transmission, and charging the battery at the third rate via the at least one motor/generator upstream of the transmission responsive to an indication that the maximum charging power of the at least one motor/generator upstream of the transmission is greater than the driver-demanded wheel power by the predetermined threshold;
wherein charging the battery at the third rate comprises charging the battery at the maximum charging power of the at least one motor/generator positioned upstream of the transmission.

11. The method of claim 1, wherein charging the battery at the second rate further comprises commanding each of the at least one motor/generator upstream of the transmission and at least another motor/generator downstream of the transmission to their respective maximum charging power.

12. The method of claim 1, wherein charging the battery at the second rate further comprises adjusting engine torque while vehicle speed is autonomously controlled.

13. The method of claim 1, wherein the maximum battery charging mode is selected by an operator.

14. A system for a vehicle, comprising:
an engine;
a dual clutch transmission positioned in a driveline of the vehicle downstream of the engine with two clutches configured to transfer engine torque to the dual clutch transmission;
an integrated starter/generator positioned in the driveline upstream of the dual clutch transmission;
an electric machine positioned in the driveline downstream of the dual clutch transmission;
an onboard energy storage device;
a cruise control system;
a selectable maximum battery charging mode of operation; and
a controller, storing instructions in non-transitory memory that, when executed, cause the controller to:
responsive to the maximum battery charging mode being selected, charge the onboard energy storage device via the engine by commanding the integrated starter/generator to a maximum ISG charging power, and command the electric machine to a maximum electric machine charging power in response to the vehicle being operated in the maximum battery charging mode of operation, and further responsive to an indication that the cruise control system is actively controlling a vehicle speed to a target vehicle speed.

15. The system of claim 14, further comprising additional instructions to adjust engine torque to control vehicle speed to the target vehicle speed during charging the onboard energy storage device via the engine by commanding the integrated starter/generator to the maximum ISG charging power, and commanding the electric machine to the maximum electric machine charging power.

16. The system of claim 14, further comprising additional instructions to charge the onboard energy storage device with the engine via both the integrated starter/generator and the electric machine as a function of driver-demanded wheel power, where a total charging power for the integrated starter/generator and the electric machine is a function of a predetermined charging torque, or a function of a percentage of a driver-demanded wheel torque, under conditions where vehicle speed is not being controlled by the cruise control system, and where a maximum integrated starter/generator power is less than the driver-demanded wheel power by a predetermined threshold; and wherein the total charging power equals a product of vehicle speed and the larger of the predetermined amount of charging torque, or the percentage of driver-demanded wheel torque.

17. The system of claim 16, further comprising additional instructions to charge the battery via only the integrated starter/generator responsive to an indication that the maximum ISG charging power of the integrated starter/generator is greater than the driver-demanded wheel power by the predetermined threshold, where charging the battery via only the integrated starter/generator includes fully opening both of the two clutches; and wherein charging the battery via only the integrated starter/generator includes charging the battery at the maximum ISG charging power of the integrated starter/generator.

18. A driveline operating method, comprising:

in response to a maximum battery charging mode in a hybrid vehicle being selected by a vehicle operator, charging the battery at a first rate via only a first motor/generator positioned upstream of a dual clutch transmission under conditions where a maximum charging power of the first motor/generator is greater than a driver demanded wheel power by a predetermined threshold;

charging the battery at a second rate via both the first motor/generator and a second motor/generator positioned downstream of the dual clutch transmission under conditions where the maximum charging power of the first motor/generator is within the predetermined threshold of driver-demanded wheel power, and where charging the battery at the second rate further comprises a total charging power of the first motor/generator and the second motor/generator that equals a product of a vehicle speed and the larger of a predetermined charging torque or a predetermined percentage of a driver-demanded wheel torque; and charging the battery at a third rate via both the first motor/generator and the second motor/generator under conditions where the vehicle speed is being controlled autonomously to a target vehicle speed via a cruise control system, where charging the battery at the third rate includes controlling the first motor/generator to a first motor/generator maximum charging power, and controlling the second motor/generator to a second motor/generator maximum charging power.

19. The method of claim 18, further comprising adjusting engine torque while charging the battery at the third rate to control the vehicle speed to the target vehicle speed.

20. The method of claim 18, further comprising mechanically decoupling the engine from the transmission to charge the battery at the first rate; and mechanically coupling the engine to the transmission to charge the battery at both the second rate and the third rate.

* * * * *